US009726783B2

(12) United States Patent
Perrier-Cornet et al.

(10) Patent No.: US 9,726,783 B2

(45) Date of Patent: Aug. 8, 2017

(54) METHODS AND SYSTEMS FOR THERMAL PRINTING OF PHOTONIC CRYSTAL MATERIALS, AND THERMALLY PRINTABLE PHOTONIC CRYSTAL MATERIALS AND ASSEMBLIES

(75) Inventors: Romain Perrier-Cornet, Toronto (CA); Andre Arsenault, Toronto (CA)

(73) Assignee: OPALUX INCORPORATED, Toronto, Ontario (CA)

(*) Notice: Subject to any disclaimer, the term of this patent is extended or adjusted under 35 U.S.C. 154(b) by 547 days.

(21) Appl. No.: 14/122,211

(22) PCT Filed: May 28, 2012

(86) PCT No.: PCT/CA2012/000517

§ 371 (c)(1), (2), (4) Date: Feb. 27, 2014

(87) PCT Pub. No.: WO2012/162805

PCT Pub. Date: Dec. 6, 2012

(65) Prior Publication Data

US 2014/0193649 A1 Jul. 10, 2014

Related U.S. Application Data

(60) Provisional application No. 61/490,909, filed on May 27, 2011.

(51) Int. Cl.

*G01K 11/06* (2006.01)
*G02B 1/02* (2006.01)

(Continued)

(52) U.S. Cl.

CPC *G02B 1/02* (2013.01); *B41J 2/32* (2013.01); *B41J 3/407* (2013.01); *B41M 5/26* (2013.01);

(Continued)

(58) Field of Classification Search

USPC .......................... 252/582; 359/288; 374/162

See application file for complete search history.

(56) References Cited

U.S. PATENT DOCUMENTS

2004/0258383 A1 12/2004 Sato et al. .................... 385/129
2007/0165903 A1* 7/2007 Munro .................... B41M 3/10 382/100

(Continued)

FOREIGN PATENT DOCUMENTS

JP 01-281447 11/1989
JP 05-318934 12/1993

(Continued)

OTHER PUBLICATIONS

Extended European Search Report for EP12794050.0, mailed Mar. 3, 2015.

(Continued)

*Primary Examiner* — Lisa Caputo
*Assistant Examiner* — Nasir U Ahmed
(74) *Attorney, Agent, or Firm* — Norton Rose Fulbright Canada LLP

(57) ABSTRACT

Methods and systems for thermal printing of thermally printable photonic crystal materials and assemblies. The photonic crystal materials and assemblies are responsive to thermal stimuli, wherein temperatures above a thermal threshold results in an optically detectable change in the appearance of the materials and assemblies. Heat is selectively applied to one or more portions of the materials and assemblies, in order to thermally print a graphic onto the materials and assemblies.

16 Claims, 6 Drawing Sheets

64

66

60

62

68

(51) Int. Cl.

| | |
|---|---|
| ***B41J 2/32*** | (2006.01) |
| ***B41J 3/407*** | (2006.01) |
| ***B41M 5/26*** | (2006.01) |
| ***B82Y 20/00*** | (2011.01) |
| ***G02B 1/00*** | (2006.01) |
| *B82Y 40/00* | (2011.01) |
| *B41M 3/14* | (2006.01) |
| *B41M 5/34* | (2006.01) |

(52) U.S. Cl.
CPC .............. *B82Y 20/00* (2013.01); *G02B 1/005* (2013.01); *B41M 3/14* (2013.01); *B41M 5/267* (2013.01); *B41M 5/34* (2013.01); *B82Y 40/00* (2013.01); *Y10T 428/31667* (2015.04)

(56) References Cited

U.S. PATENT DOCUMENTS

2007/0269725 A1* 11/2007 Steenblik ............... B82Y 20/00 430/5
2009/0086208 A1* 4/2009 Kang ..................... B82Y 20/00 356/402
2010/0150511 A1 6/2010 Arsenault ..................... 385/129
2010/0253061 A1 10/2010 Whiteman ...................... 283/85
2011/0164308 A1* 7/2011 Arsenault ................. G02F 1/15 359/322
2011/0250453 A1 10/2011 Leyrer et al. ................. 428/402

FOREIGN PATENT DOCUMENTS

JP 2000-089015 3/2000
JP 2005-011419 1/2005
JP 2005-031172 2/2005
JP 2010-537030 12/2010
WO WO 2009/143625 12/2009
WO WO 2010/020054 2/2010
WO WO 2010/057307 5/2010

OTHER PUBLICATIONS

*Zebra LP 2844 Desktop Printer User Guide*, 2004.
Search Report and Written Opinion in International Application No. PCT/CA2012/00517 mailed Sep. 12, 2012.

* cited by examiner

FIG. 2

| Repeating Unit | $T_g$ (°C) | $T_m$ (°C) |
|---|---|---|
| Acenaphthylene | 214 | |
| Acetaldehyde | -32 | 165 |
| 4-Acetoxystyrene | 116 | |
| Acrylamide | 165 | |
| Acrylic acid | 105 | |
| Acrylonitrile, syndiotactic | 125 | 319 |
| Allyl glycidyl ether | -78 | |
| Benzyl acrylate | 6 | |
| Benzyl methacrylate | 54 | |
| Bisphenol A-*alt*-epichlorohydrin | 100 | |
| Bisphenol A terephthalate | 205 | |
| Bisphenol carbonate | 174 | |
| Bisphenol F carbonate | 147 | |
| Bisphenol Z carbonate | 175 | |
| 4-Bromostyrene | 118 | |
| *cis*-Butadiene | 102 | 1 |
| *trans*-Butadiene | -58 | 148 |
| 1-Butene | -24 | 171 |
| *N*-*tert*-Butylacrylamide | 128 | |
| Butyl acrylate | -54 | |
| *sec*-Butyl acrylate | -26 | |
| *tert*-Butyl acrylate | 43-107 | 193 |
| 2-*tert*-Butylaminoethyl methacrylate | 33 | |
| Butyl glydicyl ether | -79 | |
| Butyl methacrylate | 20 | |
| *tert*-Butyl methacrylate | 118 | |
| 4-*tert*-Butylstyrene | 127 | |
| *tert*-Butyl vinyl ether | 88 | 250 |
| Butyl vinyl ether | -55 | 64 |
| ε-Caprolactone | -60 | |
| Cellulose nitrate | 53 | |
| Cellulose tripropionate | | |
| *cis*-Chlorobutadiene | -20 | 80 |
| *trans*-Chlorobutadiene | -40 | 101 |
| 2-Chlorostyrene | 119 | |
| 3-Chlorostyrene | 90 | |
| 4-Chlorostyrene | 110 | |
| Chlorotrifluoroethylene | 52 | 214 |
| 2-Cyanoethyl acrylate | 4 | |
| Cyclohexyl acrylate | 19 | |
| Cyclohexyl methacrylate | 92 | |
| Cyclohexyl vinyl ether | 81 | |
| 2,6-Dichlorostyrene | 167 | |
| Diethylaminoethyl methacrylate | 20 | |

| Repeating Unit | $T_g$ (°C) | $T_m$ (°C) |
|---|---|---|
| *N,N*-Dimethylacrylamide | 89 | |
| Dimethylaminoethyl methacrylate | 19 | |
| 2,6-Dimethyl-1,4-phenylene oxide | 167 | |
| Dimethylsiloxane | -127 | -40 |
| 2,4-Dimethylstyrene | 112 | |
| 2,5-Dimethylstyrene | 143 | |
| 3,5-Dimethylstyrene | 104 | |
| Dodecyl acrylate | -3 | |
| Dodecyl methacrylate | -65 | |
| Dodecyl vinyl ether | -62 | |
| Epibromohydrin | -14 | |
| Epichlorohydrin | -22 | |
| 1,2-Epoxybutane | -70 | |
| 1,2-Epoxydecane | -70 | |
| 1,2-Epoxyoctane | -67 | |
| 2-Ethoxyethyl acrylate | -50 | |
| 4-Ethoxystyrene | 86 | |
| Ethyl acrylate | -24 | |
| Ethyl cellulose | 43 | |
| Ethylene, HDPE | -125 | 130 |
| Ethylene adipate | -46 | 54 |
| Ethylene-*trans*-1,4-cyclohexyldicarboxylate | 18 | – |
| Ethylene isophthatate | 51 | |
| Ethylene malonate | -29 | |
| Ethylene 2,6-napthalenedicarboxylate | 113 | |
| Ethylene oxide | -66 | 66 |
| Ethylene terephthalate | 72 | 265 |
| 2-Ethylhexyl acrylate | -50 | |
| 2-Ethylhexyl methacrylate | -10 | |
| 2-Ethylhexyl vinyl ether | -66 | |
| Ethyl methacrylate | 65 | |
| Ethyl vinyl ether | -43 | 86 |
| 4-Fluorostyrene | 95 | |
| Formaldehyde | -82 | 181 |
| Hexadecyl acrylate | 35 | |
| Hexadecyl methacrylate | 15 | |
| Hexyl acrylate | 57 | |
| Hexyl methacrylate | -5 | |
| 2-Hydropropyl methacrylate | 76 | |
| Hydroquinone-*alt*-epichlorohydrin | 60 | |
| 2-Hydroxyethyl methacrylate | 57 | |
| Indene | 85 | |
| Isobornyl acrylate | 94 | |
| Isobornyl methacrylate | 110 | |

FIG. 5

| Repeating Unit | $T_g$ (°C) | $T_m$ (°C) |
|---|---|---|
| Isobutyl acrylate | -24 | |
| Isobutylene | -73 | |
| Isobutyl methacrylate | 53 | |
| Isobutyl vinyl ether | -19 | 165 |
| *cis*-Isoprene | -63 | 28 |
| *trans*-Isoprene | -66 | 65 |
| *N*-Isopropylacrylamide | 85-130 | |
| Isopropyl acrylate, isotactic | -11 | 162 |
| Isopropyl methacrylate | 81 | |
| Methacrylic acid | 228 | |
| Methacrylic anhydride | 159 | |
| Methacrylonitrile | 120 | |
| 2-Methoxyethyl acrylate | -50 | |
| 4-Methoxystyrene | 113 | |
| Methyl acrylate | 10 | |
| Methyl cellulose | | |
| Methyl glycidyl ether | -62 | |
| Methyl methacrylate, atactic | 105,120 | |
| Methyl methacrylate, syndiotactic | 115 | 200 |
| 4-Methylpentene | 29 | 250 |
| Methylphenylsiloxane | -86 | |
| Methylstyrene | 20 | |
| 3-Methylstyrene | 97 | |
| 4-Methylstyrene | 97 | |
| Methyl vinyl ether | -31 | 144 |
| Nylon 4,6 (tetramethylene adipamide) | 43 | |
| Nylon 6 (-caprolactam) | 52 | 225 |
| Nylon 6,6 (hexamethylene adipamide) | 50 | 265 |
| Nylon 6,9 (hexamethylene azelamide) | 58 | |
| Nylon 6,10 (hexamethylene sebacamide) | 50 | 227 |
| Nylon 6,12 (hexamethylene dodecane-diamide) | 46 | |
| Nylon 11 (ω–undecanamide) | 42 | 189 |
| Nylon 12 (ω-dodecanamide) | 41 | 179 |
| 1-Octadecene | 55 | |
| Octadecyl methacrylate | -100 | |
| 1-Octene | -63 | |
| Octyl methacrylate | -20 | |
| Oxy-4,4'-biphenyleneoxy-1,4-phenylenesulfonyl-1,4-phenylene | 230 | 290 |
| Oxy-1,4-phenylenesulfonyl-1,4-phenyleneoxy-1,4-phenyleneisopropylidene-1,4-phenylene | 165 | 190 |
| Oxy-1,4-phenylenesulfonyl-1,4-phenylene ether | 214 | 230 |
| *p*-Phenylene isophthalamide | 225 | 380 |
| *p*-Phenylene terephthalamide | 345 | |
| Phenylene vinylene | 80 | 380 |
| Phenyl methacrylate | 110 | |
| Phenyl vinyl ketone | 74 | |
| Potassium acrylate | 194 | |
| Propylene, atactic | -13 | |
| Propylene, isotactic | -8 | 176 |
| Propylene, syndiotactic | -8 | |
| Propylene oxide | -75 | 66 |
| Propyl vinyl ether | -49 | 76 |
| Sodium acrylate | 230 | |
| Sodium methacrylate | 310 | |
| Styrene, atactic | 100 | |
| Styrene, isotactic | 100 | 240 |
| Tetrabromobisphenol A carbonate | 157 | |
| Tetrafluoroethylene | 117 | 327 |
| Tetrahydrofuran | -84 | |
| Tetramethylene adipate | -118 | |
| Tetramethylene terephthalate | 17 | 232 |
| Thio-1,4-phenylene | 97 | 285 |
| 2,2,2-Trifluoroethyl acrylate | -10 | |
| Trimethylene oxide | -78 | |
| Trimethylsilyl methacrylate | 68 | |
| 2,4,6-Trimethylstyrene | 162 | |
| Vinyl acetal | 355 | 82 |
| Vinyl acetate | 30 | |
| Vinyl alcohol | 85 | 220 |
| Vinyl benzoate | 71 | |
| Vinyl 4-*tert*-butylbenzoate | 101 | – |
| Vinyl butyral | 322 | 49 |
| Vinyl carbazole | 227 | 320 |
| Vinyl chloride | 81 | 227 |
| Vinyl cyclohexanoate | 76 | |
| Vinylferrocene | 189 | |
| Vinyl fluoride | 41 | 200 |
| Vinyl formal | 105 | |
| Vinylidene chloride | -18 | 200 |
| Vinylidene fluoride | -40 | 171 |
| 2-Vinyl naphthalene | 151 | |
| Vinyl pivalate | 86 | |
| Vinyl propionate | 10 | |
| 2-Vinylpyridine | 104 | |
| 4-Vinylpyridine | 142 | |
| 1-Vinyl-2-pyrrolidone | 54 | |
| Vinyl trifluoroacetate | 46 | |

FIG. 6

METHODS AND SYSTEMS FOR THERMAL PRINTING OF PHOTONIC CRYSTAL MATERIALS, AND THERMALLY PRINTABLE PHOTONIC CRYSTAL MATERIALS AND ASSEMBLIES

CROSS-REFERENCE TO RELATED APPLICATION

This application is a national phase application under 35 U.S.C. §371 of International Application No. PCT/CA2012/000517 filed May 28, 2012, which claims priority from U.S. provisional patent application No. 61/490,909, filed May 27, 2011. The entire contents of each of the above-referenced disclosures is specifically incorporated herein by reference without disclaimer.

TECHNICAL FIELD

The present disclosure relates to thermally printable photonic crystal materials and assemblies, and methods and systems for thermal printing of such materials and assemblies. In particular, the present disclosure relates to methods and systems for applying localized thermal stimuli to thermally printable photonic crystal materials and assemblies to print on such materials and assemblies, for example to encode a graphic, such as an image, alphanumeric characters, data (e.g., graphical or alphanumeric information) and such onto the photonic crystal materials and assemblies.

BACKGROUND

Photonic crystal (PC) material are materials having a periodic modulation in their refractive index (Yablonovitch, Phys. Rev. Lett., 58:2059, 1987), giving rise to a photonic band gap or stop gap, in which electromagnetic waves within a certain stop band wavelength range are totally or mostly reflected. The wavelengths of the stop band are dependent on the distance between the periodic modulations in the material. The reflected stop band wavelengths appear in the reflectance spectrum as a distinct reflectance peak that may be referred to as a Bragg peak. The crystal may have a one-, two-, or three-dimensional periodic structure.

Because of the sensitivity of a PC material, slight changes in the refractive index and/or lattice spacing of the material may result in detectable changes in the reflected light. This may be particularly useful where the reflected light is in the visible range, allowing for detectable changes in color if the refractive index or lattice spacing is modulated. By incorporating polymers into PC materials, these materials may be made responsive to external stimuli, such as mechanical forces. An example of such an application is described by Arsenault et al. in PCT Patent Application No. 2008/098339, which is herein incorporated by reference in its entirety.

Photonic crystal materials have been used in security articles to indicate authenticity, because of their reflective nature and their property of displaying color-shift upon tilting the material relative an incident light source or to a viewer. Despite the attractiveness of photonic crystal materials for use in security devices, there has been an unmet need for relatively rapid and cost-effective patterning or printing of these materials.

SUMMARY

The present disclosure describes examples of thermally printable photonic crystal materials and assemblies, and methods and systems for thermal printing of such materials and assemblies. Examples of the disclosed thermally printed photonic crystal materials and assemblies may be useful as security and authentication markers in products and documents, for example, as well as other applications. Examples of the disclosed methods and systems may be useful for relatively cost-effective printing of such materials and assemblies, for example as appropriate for security and authentication applications.

In some example aspects of the present disclosure, there is provided a method for thermal printing of a thermally printable photonic crystal material or assembly, the method including: providing the photonic crystal material or assembly, the material or assembly having an optically detectable change in its reflection peak when exposed to a temperature equal to or about a thermal threshold; and exposing the photonic crystal material or assembly to a heat source, the heat source being controllable to selectively apply heat to one or more portions of the photonic crystal material or assembly and not the remainder of the photonic crystal material or assembly; wherein the heat being applied is equal to or greater than the thermal threshold of the photonic crystal material or assembly, in order to cause an optically detectable change in the heated portion(s) of the material or assembly.

In some examples, the heat source may be a thermal printer (e.g., serial printer), a hot embossing cylinder, a laser-writing system, a photothermal source in conjunction with a patterned mask, a microheater array, or any other suitable source. In some examples, the heat profile provided by the heat source may be controlled by, for example a controller such as a programmable processor. In other examples, the heat profile provided by the heat source may be controlled manually, for example by changing a printing plate, screen or stamp. In some examples, the heat source may be a hot embossing stamp or roller, thermal gravure printing head or thermal screen print head, among others.

In some example aspects of the present disclosure, there is provided a thermal printing system for thermal printing of a thermally printable photonic crystal material or assembly, the system including a heat source for applying spatially inhomogeneous heat to the photonic crystal material or assembly, and a controller for controlling heat applied by the heat source. This system may include a thermal printer as the heat source. The thermal printer may have adjustable and/or pre-set settings and/or components in order to achieve the desired printing function. The thermal printing may be used with a certain combination of print head type, print head pressure, print head writing speed, print head temperature, print head profile/shape, print head material, print head surface coating, and/or operating software, among other settings.

In some example aspects of the present disclosure, there is provided a thermally printable photonic crystal material capable of exhibiting monochrome, relatively high-contrast graphical contents and/or multi-color graphical contents by exposure to a spatially inhomogeneous heat source.

In some examples aspects of the present disclosure, there is provided a thermally printable photonic crystal assembly including a thermally printable photonic crystal material and one or more of: a base substrate, a protective or insulating top-coat, and a fixing coating. The assembly may further include one or more adhesive layers, a top substrate and/or a protective cover-sheet.

BRIEF DESCRIPTION OF DRAWINGS

FIG. 2 shows an example examples of relatively high-contrast and high resolution monochrome graphical content thermally printed on an example thermally printable photonic crystal assembly;

FIG. 5 and FIG. 6 are tables listing example monomers of polymers suitable for use in an example thermally printable photonic crystal assembly.

DETAILED DESCRIPTION

Thermally Printable Photonic Crystal Material

Figure 1A:
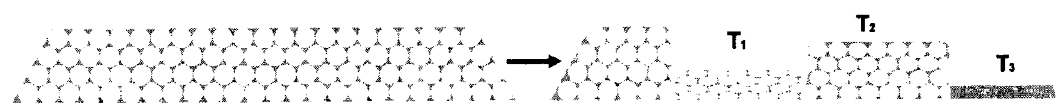
FIGS. 1A and 1B are schematic cut-away views of example thermally printable photonic crystal materials showing uniform and non-uniform deformations in response to heat applied by an example thermal printing system.

A photonic crystal material may include periodic elements with repeating structures in 1, 2, or 3 dimensions. For example, a 1-dimensional periodic structure may include alternating planar layers of 2 or more different materials having substantially dissimilar refractive indices. For example, a 2-dimensional periodic structure may include an ordered array of pillars or holes (e.g., cylindrical pillars or cylindrical holes, or other suitable geometries of pillars or holes) in a material. For example, a 3-dimensional periodic structure may include an array of particles (e.g., substantially spherical particles or other suitable particle geometries, including irregular particles) in air, particles (e.g., substantially spherical particles or other suitable particle geometries, including irregular particles) in a second material, or voids (e.g., substantially spherical voids or other suitable void geometries, including irregular voids) in a material.

The reflectance spectrum of a photonic crystal material may be altered, for example by modifying the lattice spacing within the photonic crystal. Since transmissivity of a material is related to its reflectivity, for example in that wavelengths that are reflected are not transmitted through the material and vice versa, the transmittance spectrum of a photonic crystal material may also be altered when the reflectance spectrum is altered. For example, a photonic crystal material may exhibit a change in the reflectance and transmittance spectra in response to a thermal stimulus. Such a response may be at least partially effected, for example, through the incorporation of one or more thermally sensitive components into the structure of a photonic crystal material. Additionally or alternatively, in some examples, the structure of the photonic crystal material may be at least partially responsive to a thermal stimulus.

In some examples, a photonic crystal material may display a certain characteristic reflection peak in its initial state. The exposure of the photonic crystal material to a thermal stimulus, such as temperatures above a predetermined threshold, may cause a physical and/or chemical change (e.g., physical deformation and/or chemical degradation) of the internal structure of the photonic crystal material (e.g., gradually or substantially instantly), resulting in an optically detectable change in reflected wavelengths and/or a change (e.g., a detectable decrease) in the intensity of the characteristic reflection peak. Such a change may be visually detectable by the naked eye. Where only a portion of the photonic crystal material has been subjected to such a thermal stimulus, different portions of the material may have different appearances, thus enabling the encoding of a graphic, such as a pattern, an image, data, etc. on the material.

In some examples, the photonic crystal material may be responsive to temperatures above a known or predetermined thermal threshold, such that the controlled application of heat may be used for thermal printing of the material.

The use of a controllable spatially inhomogeneous heat source, for instance from a thermal printer or from a hot-embossing roller, may allow certain regions of the photonic crystal material to be thermally stimulated and other regions unaffected, to selectively print on the material.

For a photonic crystal material having such thermal response, means of exposure to a spatially inhomogeneous heat source may allow the photonic crystal material to be imparted with a spatially inhomogeneous optical appearance. That is, for a photonic crystal material having a substantially uniform initial appearance (e.g., all portions of the material exhibit substantially the same reflectance spectrum), after exposure to the spatially inhomogeneous heat source, one or more portions of the photonic crystal material may exhibit an optical appearance different from the remainder of the photonic crystal material (e.g., due to changes in the reflectance spectra of such portions). This may permit the encoding of optical information, such as graphical images and/or graphical information contents, into the photonic crystal material.

This process may also be referred to as thermal printing of the photonic crystal material. Examples of suitable methods for applying spatially inhomogeneous heat to a thermally printable photonic crystal material include but are not limited to: thermography, thermal printing, thermal transfer printing, hot embossing, laser writing, photothermal patterning, and microheater matrix arrays, among others. These and other suitable methods may be generally referred to a thermal printing, even though a thermal printer may not be used.

In an example, a thermally printable photonic crystal material may include an ordered array of voids. Such voids may cause a modulation in refractive index, with the result that such an array of voids may cause diffraction and thus reflection/transmission of an initial wavelength range for light impinging on this photonic crystal material, giving rise to an initial reflection/transmission spectrum. Exposure of such a porous photonic crystal material to temperatures above a thermal threshold of the material may cause a disruption (e.g., collapse of lattice layers or decrease in lattice spacing) of the ordered array of voids, which may then cause a decrease in the intensity of reflectance for the initial wavelength range.

This disruption may be due to the photonic crystal material having a characteristic melting or softening temperature or temperature range (i.e., a thermal threshold), below which it may be relatively rigid and stable. At temperatures at or above this melting or softening temperature or temperature range, the photonic crystal material may begin to soften and/or flow, resulting in the softening and sagging deformation of the ordered array of voids, thereby causing the reflection intensity and/or wavelength range of the reflection spectrum to change. For example, a deformation of the ordered array of voids may include collapsing of the lattice layers, in which case the reflectance wavelength may be unchanged, but the intensity of reflectance may be decreased. The deformation may alternatively or in addition include a decrease in the spacing between lattice layers, in which case the reflectance wavelength may be shifted.

In an example, a thermally printable photonic crystal material may include periodically repeating layers with different refractive indices (which may be substantially planar), thus forming a photonic crystal with 1-D periodicity (which may also be referred to as a Bragg Stack). The periodic alternation of layers with different refractive indices may cause a periodic modulation in refractive index, with the result that such a layered array may cause diffraction and thus reflection/transmission of an initial wavelength range for light impinging on this photonic crystal material, giving rise to an initial reflection/transmission spectrum. The refractive index difference between the alternating layers may be the result of a refractive index contrast between different materials used in different layers and/or the result of different porosities in the different layers. Examples of photonic crystals with 1-D periodicity, that may be suitable for the present disclosure, may be found in PCT Publication No. 2009/143625, the entirety of which is hereby incorporated by reference.

At least one of the layers in this photonic crystal with 1-D periodicity may exhibit a degree of porosity (which porosity may be ordered or unordered), and exposure to temperatures above a thermal threshold of the material may cause a disruption (e.g., collapse or decrease in spacing) of the voids within one or more layers of the photonic crystal, which may correspondingly result in a change in the reflectance away from the initial wavelength range.

For example, the photonic crystal material may include layers of type A and B alternating with each other, where layers of type A includes thermally collapsible voids. When exposed to temperatures above a thermal threshold of layers of type A, the voids of these layers may collapse, resulting in a decrease in the thickness of the layers of type A. This may cause a decrease in the lattice constant of the photonic crystal material, and result in a blue-shift in the reflected wavelength range.

Although the above example describes a change in lattice constant giving rise to a change in the reflected wavelength range, thermal collapse of voids in the layers of type A may also give rise to a change in refractive index of those layers (e.g., due to the change in porosity and/or thickness of the layers of type A). Such a change in the refractive index may change the refractive index contrast between the layers of the photonic crystal material, thereby resulting in a shift in the reflected wavelength range. Where the reflected wavelength range has been shifted out of the visible spectrum (e.g., into UV ranges), the photonic crystal material may be rendered substantially transparent.

For example, the refractive index of the layers of type A, after thermally collapsing the voids, may be substantially similar to the refractive index of the layers of type B, such that there is substantially no refractive index contrast between the layers and therefore the photonic material may be rendered non-reflective (e.g., transparent).

In another example, the layers of types A and B may be may of the same material but have different porosity, thereby giving rise to a refractive index contrast. When thermal stimulus is applied, the voids in all the layers may be collapsed, and the lose of porosity in all the layers may result in a loss of refractive index contrast, again resulting in a non-reflective or transparent material.

In some examples, such a thermally printable photonic crystal material may be sensitive to different thermal conditions. In some examples, the material may have a single thermal threshold, such that once the material is exposed to temperatures reaching or exceeding the thermal threshold, the material may exhibit disruptions to the ordered array. Such disruptions may be instantaneous (e.g., complete collapse of all voids substantially instantaneously) or gradual (e.g., gradual collapse of voids over a period of time) when the material is exposed to temperatures at or above its thermal threshold. The type and/or degree of response exhibited by the material may be at least partially dependent on the temperatures it is exposed to. For example, at temperatures just at or slightly above its thermal threshold, a material may exhibit a very gradual response, whereas at temperatures much high than its thermal threshold, a material may exhibit a nearly instantaneously response.

In some examples, a photonic crystal material may have two or more thermal thresholds, each having a different effect on disruptions to its ordered array. The material may be designed to be responsive to two or more thermal thresholds by, for example, designing the photonic crystal material to have different deformations at different thermal thresholds. For example, a photonic crystal material may include different bonds (e.g., different chemical and/or mechanical bonds) that deteriorate at different temperatures. A photonic crystal material may also include one or more polymers having phases and/or regions with varying chemical composition, with each one of these phases and/or regions having a different characteristic thermal response.

A photonic crystal material may include one or more additives that are temperature-sensitive. For example, there may be wax nanoparticles embedded in a photonic crystal material that melt at a certain thermal threshold different from the thermal threshold of a polymer material in the photonic crystal material. When the thermal threshold of the wax nanoparticles is exceeded, the wax melts, thus changing the lattice structure and/or refractive index of the photonic crystal material. There may be different types of such wax nanoparticles, with different thermal thresholds, to provide the material with several different thermal thresholds. Other such nanoparticles and/or additives having different temperature responses may be included in a photonic crystal material.

The property of having two or more thermal thresholds may allow a photonic crystal material to be thermally printed two or more times. For example, a photonic crystal material having two thermal thresholds may be first thermally printed using temperatures above the lower thermal threshold but below the higher thermal threshold. A second thermal printing may then be carried out using temperatures above the higher thermal threshold, which may allow the first printing to be printed over by the second printing. Alternatively, the order of the thermal printing temperatures may be reversed, such that the second printing does not print over the first printing. Other such printing processes may be used for photonic crystal materials having different ranges and numbers of thermal thresholds.

The photonic crystal material may be thermally printed to provide a monochrome print or a multi-color print. For example, applying the same temperature and the same period of time for each application of temperature for the entire printing process may result in a monochrome print, as the material may exhibit same or similar degrees of deformation in all printed regions. To obtain a multi-color print, different temperatures and/or different periods of time for each application of temperature during the printing process may result in the material exhibiting different degrees of deformation in different printed regions, such that different regions may have different reflectance spectra detectable as different colors.

Figure 1B:
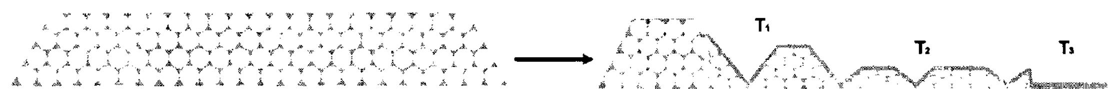

FIGS. 1A and 1B are schematic diagrams showing cross-sections of an example thermally printable photonic crystal material. In this example, the material may be exposed to a spatially and thermally inhomogeneous heat source that may be applied by various methods, for example including but not limited to: thermal printing, thermal transfer printing, hot embossing, laser writing, photothermal patterning, and microheater matrix arrays, among others. The inhomogeneous heat source may be configured to print a pattern, alphanumeric characters, an image or any other graphic on the photonic crystal material.

In some examples, the heat source may provide different temperatures and/or heat flows, which may expose the photonic crystal material to different temperatures exceeding two or more thermal thresholds of the material (e.g. T1 and T2). The different temperatures provided by the heat source may each result in different amplitudes of deformations spatially distributed on the photonic crystal material. In some examples, the achievement of multiple deformations of different amplitudes may result in a multi-color graphic being printed on the material.

In some examples, a thermally printable photonic crystal material may be designed to respond in a relatively uniform manner so that the exposure to an inhomogeneous heat source may result in the attainment of relatively uniform color rendition of the deformed area, to achieve a monochrome print (as shown in FIG. 1A, for example).

In some examples, a thermally printable photonic crystal material may be designed to respond in a non-uniform manner to exposure to an inhomogeneous heat source (as shown in FIG. 1B, for example). In some examples, the non-uniform deformation of the material may include changes to the orientation of the reflective porous polymer in all or part of the deformed area, which may result in more complex color rendition due to the material's property of displaying color-shift upon tilting relative to an incident light source or to a viewer.

In some examples, a photonic crystal material may have relatively specular, or mirror-like, reflectivity characteristics. By changing the orientation of at least one surface of the photonic crystal material, the direction in which incident light is reflected may be controlled. That is, similarly to two mirrors being tilted at different angles, two photonic crystal materials with surfaces having different orientations may reflect incident light in two substantially different directions. In this way, a photonic crystal material may be encoded with graphical information that may be visible only from certain orientations or viewing angles.

In some examples, the exposure to a temperature much higher than an additional thermal threshold (T3 as shown in FIGS. 1A and 1B) of the material may result in a complete collapse of the voids in the material and result in an appearance of the material substantially similar to a non-porous polymer (which may be substantially colorless and/or transparent).

In some examples where 1-D photonic crystals are used, exposure to a temperature sufficiently higher than a thermal threshold may result in complete collapse of the voids within at least one layer material, resulting in a decrease in the layer thickness. The lattice constant may thus be decreased but the refractive index contrast between layers may be maintained. In this case, the system may still show substantial reflective characteristics, but further exposure to increased temperature would not further shift the reflectivity since no further collapse of voids would be possible.

In some examples, the rate of occurrence of the disruption of the ordered array in a photonic crystal material may be at least partially or mostly dependent on external temperature. For example, deformation of the photonic crystal material may be relatively slow at a temperature only slightly above its thermal threshold, such that the change in its reflectance may be very gradual; whereas at a temperature much higher than its thermal threshold, deformation of the photonic crystal material may occur very rapidly, such that the change in its reflectance is relatively quick or almost immediate. The relatively quick deformation of a material at higher temperatures may allow a reduction of the amount of heat necessary to generate the deformation, which may facilitate the miniaturization of the thermal printing system and/or the achievement of a higher-speed printing process.

In some cases, the photonic crystal material may deform to the point where there is complete collapse of the ordered array of voids. In such cases, the properties of the photonic crystal material may be substantially similar to a non-porous material, such that the material may become substantially colorless and transparent (i.e., there is no more reflectance exhibited by the material).

Various approaches may be employed to design the response of a photonic crystal material to temperature, thereby affecting the print color, quality, and/or appearance. For example, formation of the photonic crystal from the polymerization of mixture of two different monomers (copolymerization) may give a thermal transition intermediate to the corresponding homopolymers. In some cases, the mixture may be chosen so as to result in a relatively narrow thermal transition for the resulting copolymer. In some cases, the mixture may be chosen as to result in a relatively broad thermal transition for the resulting copolymer. The behavior of various suitable monomer/polymer mixtures may be found in literature, for example in Polymer Handbook ($4^{th}$ ed), John Wiley and Sons.

In some cases, the specific way in which two or more monomers are polymerized may influence the thermal response of the photonic crystal material. In the case of a two-monomer copolymer involving segments A and B, segment A might show a thermal transition at a relatively lower temperature, and segment B at a relatively higher temperature. By designing the copolymer such that segments A and B are homogenously mixed, an intermediate thermal transition might result. However, if segments A and B are relatively segregated, as may be the case with a block copolymer architecture, the copolymer may show two relatively distinct thermal transitions, which may allow for a relatively more precise or more reproducible color rendition for the printed photonic crystal material. Similar effects may be achieved by combining any number of monomer segment numbers and types.

In some examples, an uncrosslinked polymer constituent may be incorporated into the photonic crystal material. For instance, high molecular weight polymers may slow the kinetics of the deformation (e.g., sagging) process through viscoelastic effects, while still allowing for the mobility of the polymer network in the photonic crystal material. Low molecular weight polymers may correspondingly increase the kinetics of the deformation process by increasing the network free energy. A person skilled in the art would understand how these and other controllable parameters (e.g., usage and/or percentage of branched vs. linear polymer chains) may be varied as appropriate in order to obtain certain desired mechanical properties of the photonic crystals.

The thermal properties of the polymer network in the photonic crystal material may also be affected by the inclusion of a crosslinking agent. A crosslinking agent may cause the material having a polymer network to exhibit a relatively broader thermal transition, since the agent may inhibit long-range mobility of polymer chains. A shorter crosslinking agent may have a greater effect, while a longer crosslinking agent may have a smaller effect. Similarly, a crosslinking agent with higher functionality (i.e., higher number of reactive groups) may have a stronger effect than a crosslinking agent with a relatively lower functionality. In some cases, the addition of a crosslinking agent may inhibit complete collapse of voids in the material, which may influence the range of colors and/or optical appearances that the photonic crystal material may exhibit. For example, if the material is prevented from total collapse of voids, the material may not change to a colorless or transparent appearance.

In some examples, a graphic thermally printed on the photonic crystal material may be irreversible, such that no further stimuli, whether thermal or any other types of stimuli, may bring the appearance of the printed regions either partially or fully back to their original unprinted appearance. In other examples, a graphic thermally printed on the photonic crystal material may be partially or fully reversible, such that additional stimuli, such as further thermal or other types of stimuli, may bring the appearance of the printed regions either partially or fully back to their original unprinted appearance.

For example, the thermally printed regions may be fully or partially reverted by exposure to a solvent (e.g., a liquid or vapor), which may swell the polymer network of the photonic crystal material and provide a restoring force sufficient to allow the original structure to return to its initial form. The thermally printed regions may also be reverted, in some examples, by exposure to a temperature above the printing temperature, such that the thermal energy may provide a sufficient entropic energy gain to provide a restoring force sufficient to allow the original structure of the photonic crystal material to return to its initial form. For example, a polymer constituent having a relatively low crosslink density may start to sag and melt the printing temperature. At the printing temperature, the entropy of the polymer network may not be high enough to overcome the sagging. However, at temperatures higher than the printing temperature (e.g., 50° C. higher or more), the entropy of the polymer network may become sufficient to provide the network with sufficient restoring force for the polymer network to maintain or recover its structure. Other means of stimulation may be used to effect a full or partial reversion in optical properties of a printed region, including but not limited to: time, temperature, ultraviolet (UV)/visible/near infrared (NIR) light, electric current or fields, solvents and mechanical stress, among others.

Methods and Systems for Thermal Printing of a Thermally Printable Photonic Crystal Material or Assembly An example method for thermal printing of a thermally printable photonic crystal material or assembly may include providing a thermally printable photonic crystal material, such as described above, or a thermally printable photonic crystal assembly, such as described below, and exposing the photonic crystal material or assembly to a heat source. The heat source may be controllable to selectively apply heat to one or more portions of the photonic crystal material or assembly and not the remainder of the photonic crystal material or assembly, and the heat being applied may be equal to or greater than a thermal threshold of the photonic crystal material or assembly, in order to cause an optically detectable change in the heated portion(s) of the material or assembly.

An example thermal printing system for thermal printing of a thermally printable photonic crystal material or assembly may include a heat source for applying spatially inhomogeneous heat to the photonic crystal material or assembly, and a controller for controlling heat applied by the heat source.

Although the present disclosure refers to thermal printing, it should be understood that a thermal printer may not be required. Examples of suitable methods and systems for applying spatially inhomogeneous heat to a thermally printable photonic crystal material or assembly, in order to thermally print the material or assembly, include but are not limited to: thermography, thermal printing, thermal transfer printing, hot embossing, laser writing, photothermal patterning, and microheater matrix arrays, among others.

An example of the disclosed thermal printing systems may include a thermal printer as the heat source. The thermal printer may have adjustable and/or pre-set settings and/or components in order to achieve the desired printing function. The thermal printing may be used with a certain combination of print head type, print head pressure, print head writing speed, print head temperature, print head profile/shape, print head material, print head surface coating, and/or operating software, among other settings.

In some examples, a thermally printable photonic crystal material or assembly may be printed upon by using a direct thermal printer. In direct thermal printing, printing of the photonic crystal material or assembly may be controlled from signals representing a graphic. Such signals may be generated in response to user input received at the printer or programming within the printer, for example. Such signals may be converted to electric pulses and then, through a driver circuit, may be selectively transferred to a thermal print head. The thermal print head may include microscopic heat resistor elements, which may convert the electrical energy into heat via the Joule effect. The electric pulses thus converted into thermal signals may manifest themselves as heat transferred to the surface of the thermally printable photonic crystal device wherein the generated deformations result in thermal printing of the material or assembly.

Variables that may affect features of the print may include, for example: print head type, print head pressure, print head writing speed, print head temperature, print head profile/shape, print head material, print head surface coating, print head construction, operating software, and other hardware aspects of the thermal printer. Such variables may be fixed or adjustable, and may be controlled by suitable input at or programming of the thermal printer.

The methods and systems used for thermal printing of a thermally printable photonic crystal material or assembly may also vary depending on the characteristics of the material or assembly.

In some examples, the thermal responsiveness of the photonic crystal material or assembly may be altered in a number of ways to modify the characteristics of the resulting thermal print. For instance, the photonic crystal material or assembly may be designed such that any thermal stimulus above its thermal threshold may cause a relatively rapid collapse of the material's or assembly's structure to give a substantially transparent/semi-transparent and colorless material or assembly. In this case, unprinted areas of the material or assembly would maintain their original appearance (e.g., colored or white) arising from diffraction, whereas printed areas would be substantially colorless (or the color of the material's or assembly's substrate), leading to a relatively high-contrast monochrome print. An example photonic crystal material or assembly having such characteristics may include a polymer constituent with a relatively sharp thermal transition and with relatively rapid flow kinetics upon exceeding its thermal threshold.

For example, such a polymer constituent may include a polymer network with a relatively low degree of cross-linking, which may result in a more complete collapse of the structure of the photonic crystal material or assembly (e.g., due to relatively complete fluidization and flow of the polymer constituent) in response to temperatures above its thermal threshold. In another example, such a polymer constituent may include a polymer network with a relatively low thermal transition temperature, such that the temperature of the writing head of a thermal printer may be substantially more elevated than the thermal transition temperature (i.e., the thermal threshold). In this case, when printed upon, the material or assembly may become mobile enough to relatively rapidly undergo collapse (e.g., due to relatively rapid fluidization and flow of the polymer constituent) of the ordered array of voids. Such a material or assembly may allow for relatively coarse control of the heat being applied by the heat source, for example the heat source may need only to generate any temperature that is at least as high as the material's or assembly's thermal threshold.

In some examples, the photonic crystal material or assembly may be designed to be sensitive to degrees in thermal stimulus. For instance, the photonic crystal material or assembly may be designed to show controlled deformation, such as sagging behavior, where the extent of deformation may be related to the amount and/or time duration of heat it is exposed to. By controlling the heat applied to the photonic crystal material or assembly (e.g., through appropriate programming of a thermal printer), the precise degree of deformation may be controlled, which may result in control over the reflection/transmission color exhibited by different regions of the photonic crystal material or assembly. Following thermal printing, this may result in a printed material or assembly showing a multi-color graphical rendition. Such a material or assembly may require relatively finer control of heat applied by the heat source.

For example, when using a thermal printer, the extent of heat applied to the photonic crystal material or assembly may be controlled by changing the pressure, temperature and/or speed of the print head, and may also be modulated by insulating coatings applied to the print head and/or photonic crystal material or assembly, for example as described below.

In some examples, thermal printing of the photonic crystal material or assembly may be carried out on a pixel-by-pixel basis. In some examples, each printed pixel may be directly reflective of the shape and surface of the print head of a thermal printer. That is, each printed pixel may correspond to a surface similar in shape and area of the print head. In some examples, a printed pixel may differ from the shape and/or area of the print head. For example, if a print head imparts an excess amount of heat, unfocused heat and/or the photonic crystal material or assembly itself is able to conduct heat, the printed pixel may have a larger area than the print head, since heat diffusion may result in heat being applied to an area of the material or assembly that is greater than the area of the print head. In some examples, the printed pixel may be smaller in area than the print head. For example, due to thermal diffusion at the edges of the print head, the heat applied to the material or assembly at the edge(s) of the print head may be less than at the centre region of the print head and may be insufficient to cause a thermal change in photonic structure of the material or assembly, whereas nearer the center of the print head heat flow may be sufficient to cause a change in the photonic structure of the material or assembly.

In some examples, the use of printing on a pixel-by-pixel basis may be used to generate a wider array of optical effects through color mixing. For instance, if pixels are printed sufficiently small and close together (e.g., 100 μm or less), the human eye may not be able to distinguish these as individual pixels, and may instead perceive a combination of the two pixel colors/effects. Therefore, a much wider variety of colors and effects may be achieved.

In some examples, thermal printing of a photonic crystal material or assembly may be encoded with multiple sets of graphical information, such that each set of graphics may be viewed from a respective different orientation or viewing angle. As described above, a photonic crystal material may have specular viewing characteristics, such that the material may have different appearances when viewed at different angles. Thermal printing of such a material or assembly including such a material may provide specular encoding of graphical information. For example, a print head of a thermal printer may press against the material at a given angle, such that the material is physically deformed and the material develops an angled specular surface. The print head may print over a portion of the material multiple times with different print head angles and/or the material may be fed into the printer in different orientations, such that the same portion of material may be encoded with different graphical information that is viewable at different angles, for example. Printing via a thermal print head may also enable other optical effects, such as roughness, haziness, and scratching, among others, which may cause further changes in optical effect.

Thermally Printable Photonic Crystal Assemblies

The above description of thermal printing of photonic crystal materials may also apply to thermal printing of photonic crystal assemblies that incorporate such materials. An example of a thermally printable photonic crystal assembly may include a thermally printable photonic crystal material, such as described above, and one or more of: a base substrate, a protective or insulating top-coat, and a fixing coating. The assembly may further include one or more adhesive layers, a top substrate and/or a protective cover-sheet.

In some examples, the photonic crystal assembly may include a protective top-coat provided over the photonic crystal material. The protective top-coat may serve to inhibit mechanical damage to the photonic crystal material. For instance, in typical thermal printers the heated print head moves along the surface of the printing surface, making contact with the printing surface but also dragging along it at some points. In some examples, the friction caused by this movement of the print head may abrade or otherwise mechanically damage the photonic crystal material, causing a degradation in the appearance of the material. The protective top-coat may be designed to be sufficiently protective against such mechanical damage by, for example, being sufficiently thick and/or resistant to deformation and/or cushioning.

In some examples, the top-coat may be made intentionally less protective, such as to cause a controlled abrasion of the underlying photonic crystal material, which may result in a desired modified optical appearance of the material. This modified optical appearance may include a change in optical scattering, haze or intensity of reflected wavelengths, without substantially affecting the reflected wavelengths (e.g., visible color). In some examples, the protective top-coat may include a polymeric base constituent with a relatively high thermal transition, such that the heat of the print head may not cause the top-coat to deform, soften, tackify, infiltrate the photonic crystal material, or otherwise be damaged. In some examples, the top-coat may have lubricating character, as to facilitate the sliding of the print head along the assembly without damage. For instance, the use of a top-coat including a fluoropolymer may result in a relatively high damage threshold for friction given that fluoropolymers are generally known to display relatively low surface energies.

In some examples, the protective top-coat may modulate the heat flow into the photonic crystal material. For instance, a relatively thinner top-coat may facilitate thermal flow via a reduced insulating behavior, whereas a relatively thicker top-coat may inhibit thermal flow via an increased insulating behavior. Specific components of the top-coat may also be chosen so as to have desired insulating properties, in order to modify the thermal response of the photonic crystal assembly.

In some examples, the photonic crystal assembly may include a photonic crystal material having an inverse opal structure, and the protective top-coat may be applied via a water-based latex dispersion. When the protective top-coat is applied in liquid form, it may be useful to prevent the components of the top-coat from penetrating fully into the inverse opal structure, since this may prevent or inhibit the inverse opal structure from exhibiting a thermal response. However, a small or minimal amount of infiltration of the top-coat components into the inverse opal structure may be acceptable. If the photonic crystal material includes suitably hydrophobic constituents, a water-based dispersion may be coated onto the surface of the material while being prevented from entering the small voids permeating the material.

In some examples, the presence of surfactant, co-solvent and/or wetting agents in the material may be sufficient to facilitate wetting of the surface of the photonic crystal material but also be low enough to allow for a latex dispersion infiltrating the inverse opal void spaces, to form the protective top-coat. The latex dispersion may be a dispersion of polymer particles (E.g., in a water-based medium). As the latex dries, the polymer particles may become densified, eventually collapsing and consolidating together to form a relatively uniform polymer film (e.g., as in paints and other coatings). The result, following drying of the latex dispersion, may be a substantially segregated layer with relatively little or minimal infiltration of solids into the inverse opal.

In some examples, a latex dispersion may include colloidal particles larger than the void spaces of the inverse opal, or particles large enough to have significantly reduced mobility within the inverse opal. In such cases, the solvent portion of the latex dispersion may penetrate the inverse opal, but the colloid portion may be substantially excluded from the inverse opal void space. Upon drying, the solvent portion may exit the void spaces, while the colloidal portion may dry and consolidate as a substantially segregated layer, thus forming a protective top-coat.

A protective top-coat may be applied to the photonic crystal material by any number of suitable coating processes, including but not limited to coating by: gravure coating, forward or reverse, direct or indirect, Mayer rod, slot die, roll coaters (e.g., forward, reverse, multiroll), multilayer cascade (e.g., slide), knife-over-roll, curtain, dip, blade, spray, Dahlgren, screen printing, extrusion, comma coating, air knife, transfer, micro Gravure™, or any other suitable methods.

In some examples, it may be useful to laminate or attach the printed or unprinted photonic crystal material to a secondary substrate. The photonic crystal material may be attached to the substrate using various suitable adhesives, or via thermal bonding, for example.

In some samples, it may be useful to be able to transfer the printed or unprinted photonic crystal assembly from its original substrate onto a secondary substrate. For this purpose, various adhesives as known in the art may be employed as transfer adhesives. The original substrate may be selected from the variety of commercially available substrates in order to achieve a suitable balance between adhesion of the photonic crystal assembly to the carrier substrate and subsequent transfer using adhesive. A variety of release coatings or other primer layers as known in the art (see for example http://releasecoatings.ca/english/) may be used to assist the formation of the photonic crystal assembly and its subsequent transfer.

In some examples, it may be useful for the structure of the photonic crystal material to be fixed after thermal printing, in order to maintain the graphic printed on the material. This may be achieved in a photonic crystal assembly including a fixing coating. The fixing coating may serve to improve the permanency of a thermally printed graphic, and may allow the photonic crystal assembly to be exposed to stimuli, including thermal stimuli such as an increased temperature, with little or no change in perceived appearance. In some examples, the fixing coating may have a crosslinkable functionality (e.g., by using monomers, prepolymers or polymers with crosslinking groups) with an associated means of initiating crosslinking (e.g., by including one or more crosslinking initiators), such that following thermal printing the crosslinking initiator may be initiated to effect crosslinking of the fixing coating.

In some examples, the fixing coating may not be a separate layer, but may be integrated into one or more components of the photonic crystal material. For example, a photonic crystal assembly having an inverse opal structure may include a fixing coating coating the photonic crystal material. The fixing coating may include monomer, prepolymer and/or polymer, a crosslinking agent, and a polymerization initiator. This fixing coating may be coated sufficiently thinly over external and internal surfaces (e.g., internal voids) of the photonic crystal material, such that the fixing coating does not significantly fill the void spaces of the inverse opal structure, but may form a relatively thin shell on its interior surfaces. Following thermal printing, a means of initiating polymerization may be applied such that the fixing coating polymerizes and may become substantially rigid or immobile, thus fixing in place the thermally printed structure of the photonic crystal material. For example, the fixing coating may include a UV photoinitiator, and following thermal printing, the printed material may be exposed to UV light to cause the fixing coating to polymerize and fix the structure of the photonic crystal material in place.

In some examples, the fixing coating may be introduced after thermal printing has taken place. For instance, a thermally printed photonic crystal material may be coated with a crosslinkable fixing coating, which may then be fixed into place using appropriate techniques. A fixing coating may be sufficiently thin that it does not significantly fill the void spaces of the inverse opal structure, such that there is no or little affect on the optical appearance of the printed material, but may form a relatively thin shell on its interior surfaces. Conversely, the fixing coating may fill the voids of the photonic crystal material significantly or completely. In such an example, the fixing coating may have a sufficiently different refractive index to that of the constituents of the photonic crystal material, so as to maintain the optical diffraction properties of the photonic crystal material. For example, the fixing coating may include a fluoropolymer base, where fluoropolymers are known to possess relatively low refractive indices compared to the majority of polymers. In this case, the low refractive index may ensure a sufficiently high refractive index contrast with a polymer-based photonic crystal material, so that introduction of the fixing coating may have little or no effect on the optical appearance of the printed photonic crystal material.

In some examples, the fixing coating may be introduced to the photonic crystal material prior to the application of a protective top-coat. In some examples, the fixing coating may be incorporated after the application of a protective top-coat. In some examples, the fixing coating may be incorporated as part of a protective top-coat.

In some examples, the inclusion of a fixing coating may not be necessary. For instance, a thermally printed photonic crystal material may be exposed to stimuli which may further form crosslinks in a polymer network of the photonic crystal material, and thus prevent or limit any further deformation in the photonic crystal material, or render any further deformation fully or partially reversible. For example, treatment by gamma-radiation, UV light, or by an electron beam may create in situ crosslink-initiating moieties in the photonic crystal material, which may initiate crosslinking of the polymer matrix of the material and therefore may effect fixing properties. In some examples, a polymer network in the photonic crystal material may have only been partially cured during manufacture. Following thermal printing, the polymer network may be fully cured (e.g., by UV radiation) to effect a fixing in place of the structure.

In some examples, a thermally printable photonic crystal assembly may be printed with three different graphical information contents, such as linear barcodes (e.g., 128 and Postnet codes), 2D barcodes (e.g., QR and Aztec codes) and composite barcodes (e.g., GS1 databar stacked code), among others. A thermal printer suitable for such printing may be, for example, a direct thermal label printer (e.g., Zebra LP2844), which may be operated with appropriate software that converts a graphical label design into electric pulses and thus thermal signals to generate spatially inhomogeneous heat transferred to the thermally printable photonic crystal assembly via the print head of the printer.

In some examples, a thermally printable photonic crystal assembly may be printed using an appropriate printer (e.g., a direct thermal label printer such as Zebra LP2844), to have relatively fine resolution. For example, a resolution of 203 dots per inch or 8 dots per millimeter may be achievable at a print speed of 4 inches (102 millimeter) per second. The deformation of the photonic crystal assembly may be spatially controllable on the microscopic scale to generate fine graphics using thermal printing methods for high resolution image printing.

Figure 2:
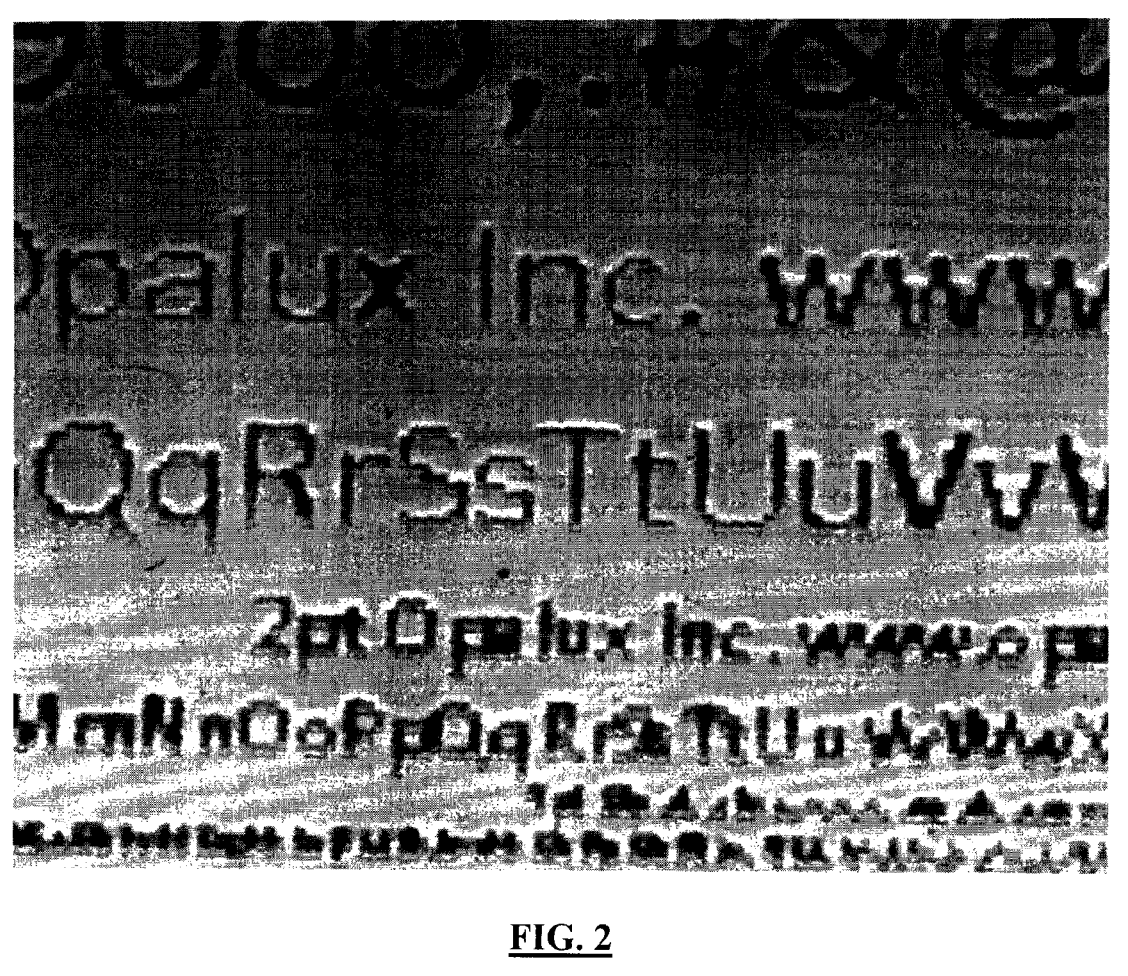

FIG. 2 shows an image of an example thermally printable photonic crystal assembly that demonstrates relatively high-contrast and high resolution monochrome graphical content. The printed font in this example is about 2 point font (approximately 0.7 mm in height). In this example, the assembly was printed using a medical grade monochrome digital thermal printer (P-95DW thermal printer by Mitsubishi). This example thermal printer may have a relatively high density thermal print head (about 1280 dots/100 mm or about 325 dpi), a standard resolution of about 1280×960, and a print speed of about 10 feet/min. The operating temperature for this example printer may be about 5-40° C. Other thermal printers may be used, and the photonic crystal assembly may be designed to accommodate the operating characteristics (e.g., operating temperature, paper thickness requirement, paper size, etc.) of the thermal printer, or any other heat source.

Figure 3A:
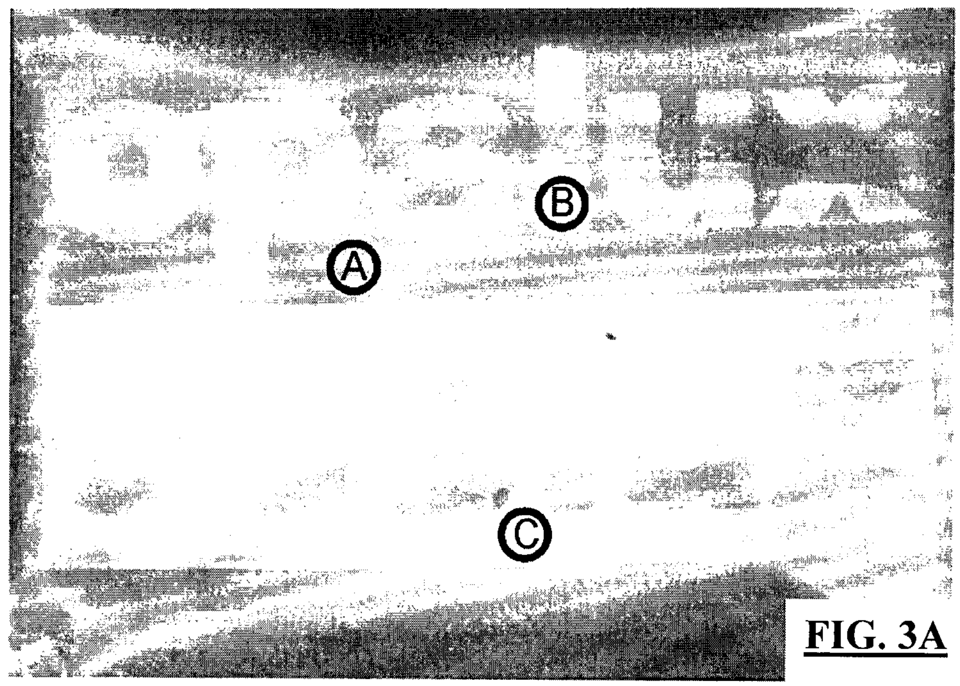
FIGS. 3A and 3B show an example of multi-color graphical content thermally printed on an example thermally printable photonic crystal assembly and an example reflection spectrum for the printed assembly.
Figure 3B:
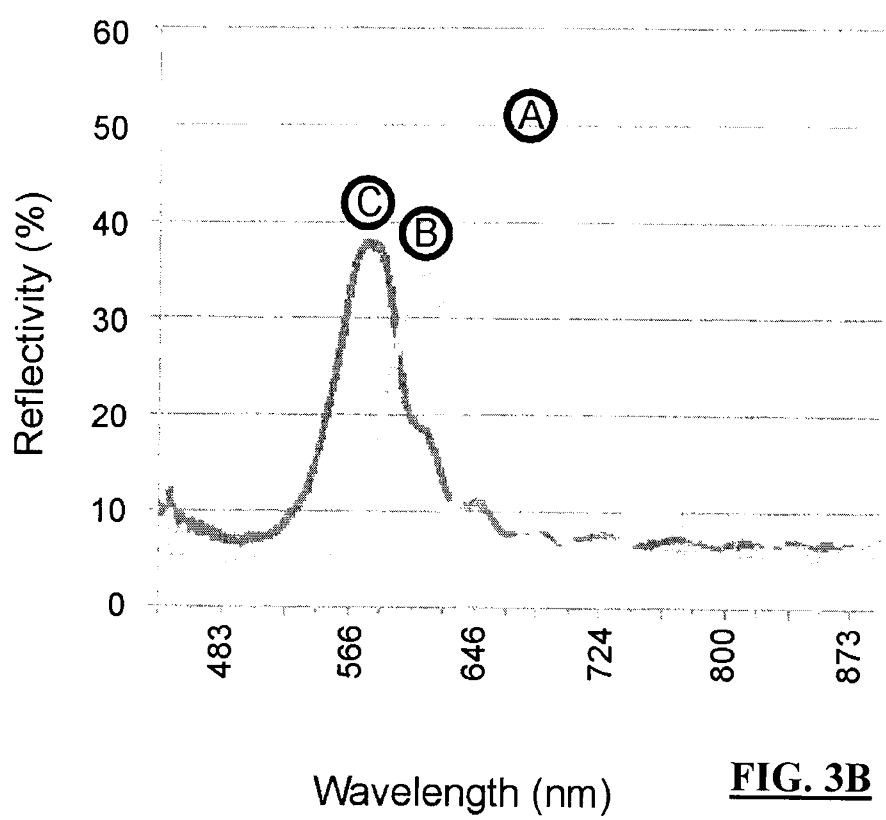

FIG. 3A shows a picture of an example thermally printable photonic crystal assembly printed with a multi-color graphical content. As shown, the graphic may include different colored portions (labeled A, B, C, which may be blue, red and green, respectively). FIG. 3B shows plots of the reflectivity maximum of the thermally printable photonic crystal assembly at different color renditions owing to different stages of thermal deformation (corresponding to A, B and C portions of FIG. 3A). In this example, the multi-color graphics were generated by applying different temperatures or heat flows to the photonic crystal assembly using a direct thermal label printer set at different levels of optical density corresponding to different print head temperatures. These figures demonstrate that for a given photonic crystal assembly, a multi-color pattern may be generated by suitable programming and/or settings (e.g., adjusting the print head temperatures) of a thermal printer.

Examples of Suitable Photonic Crystal Materials

In some examples, the photonic crystal material may be based on an ordered array of first constituents, such as substantially spherical constituents. Examples of suitable first constituents (which may be substantially spherical) for use in an ordered array include metal oxides (such as silica, titania, zinc oxide, tin oxide, aluminum oxide, etc.) and/or polymers. A second constituent may then be introduced into the void spaces within the ordered array of the first constituents. In some examples, the first constituents may be removed (for example by dissolution, chemical etching, or any other suitable method) to provide a photonic crystal material having what may be referred to as an inverse opal structure.

In some examples, where the photonic crystal material includes a polymer matrix, the photonic crystal material may include one or more of: polystyrenes, polymethacrylates, polyacrylates, polyurethanes, polyesters, polyethylenes, polypropylenes, polyamides, polyimides, polycarbonates, fluoropolymers, polyvinylchlorides, polyisoprene, polybutadiene, polydienes, polyolefins, polyethers, polyvinyl acetals, polyvinyl esters, polyvinyl ethers, polyvinyl ketones, polyvinylpyridines, polyvinylpyrrolidones, polyamines, polycations, polyanions, ionomers, polyvinyl alcohols, polyvinyl acids, epoxy resins, silicones, waxes, polysaccharides, cellulosic polymers, polylactides, biopolymers, biodegradable polymers, conducting polymers, redox-polymers, polymers containing metal atoms, and copolymers or combinations thereof. The polymer may be a cross-linked polymer network, for example, to form a polymer matrix. Other conventional polymers may be suitable, including monomers, crosslinkers, polymerization initiators, or other polymer precursors described on the Aldrich Polymer Science page (http://www.sigmaaldrich.com/materials-science/polymer-science.html), or provided by industrial suppliers such as Sartomer.

In some examples, the cross-linked polymer network may include any suitable cross-linked polymers including, for example, cross-linked polymethacrylate and/or cross-linked polyacrylate polymers. The polymer matrix may be formed from a monomer or pre-polymer. Suitable monomers or pre-polymers may include, for example, one or more of: methacrylic acid esters, acrylic acid esters, polyisoprene, polybutadiene, polyurethane precursors, crosslinkable polyethers, and mixtures thereof. In some examples, the methacrylic acid ester may be one or more of: ethylhexyl methacrylate, lauryl methacrylate, butyl methacrylate, methyl methacrylate, stearyl methacrylate, butoxyethyl methacrylate, and mixtures thereof. In some examples, the acrylic acid ester may be one or more of: butoxyethyl acrylate, hydroxyethyl acrylate, 2-carboxyethyl acrylate, stearyl acrylate, lauryl acrylate, butyl acrylate, hexyl acrylate, and mixtures thereof. In some examples, the crosslinkable polyether may be one or more of: polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof. A list of other suitable acrylate, methacrylate, and other monomers may be found, for example, in the catalogues of chemical suppliers such as Aldrich and Sartomer.

In some examples, the polymer matrix may be formed from a monomer or pre-polymer selected from one or more of: methacrylic acid esters, acrylic acid esters, polyisoprene, polybutadiene, polyurethane precursors, polyolefin precursors, polyethers, and mixtures thereof. In some examples, the polymer matrix may be formed from the polymerization of monofunctional acrylic acid esters or multifunctional acrylic acid esters. In some examples, the monofunctional acrylic acid ester may be one or more of: butoxyethyl acrylate, hydroxyethyl acrylate, 2-carboxyethyl acrylate, poly(2-carboxyethyl) acrylate, stearyl acrylate, lauryl acrylate, butyl acrylate, hexyl acrylate, 2-phenoxyethyl acrylate and mixtures thereof. In some examples, the multifunctional acrylic acid ester may be one or more of: diacrylates, triacrylates, polyacrylates, and mixtures thereof. In some examples, the diacrylate may be one or more of: ethylene glycol diacrylate, poly(ethylene glycol) diacrylates, neopentyl glycol diacrylate, neopentyl glycol propoxylate (1 PO/OH) diacrylate, and mixtures thereof.

In some examples, formation of the polymer matrix may be facilitated by a polymerization initiator. An example of a suitable polymerization initiator may be a free radical initiator which may polymerize vinyl, acrylate, thiol, unsaturated, or methacrylate functional monomers. In some examples, the polymerization initiator may be a cationic initiator, which may polymerize epoxide and vinyl ether functional monomers. In some examples, the initiator may be activated by UV light, for example where the initiator includes a photoinitiator; or may be activated by heat, for example where the initiator includes a thermal initiator.

In some examples, the polymer matrix may contain some free polymer chains in addition to a cross-linked polymer network. These polymer chains may be formed during the cross-linking of the polymer network, or alternatively may be formed prior to the crosslinking step. If formed prior to the crosslinking step, other steps may involve purification or fractionation of the free polymer chains prior to incorporation into the polymer network precursor mixture. Free polymer chains may comprise one or more of: polystyrenes, polymethacrylates, polyacrylates, polyurethanes, polyesters, polyethylenes, polypropylenes, polyamides, polyimides, polycarbonates, fluoropolymers, polyvinylchlorides, polyisoprene, polybutadiene, polydienes, polyolefins, polyethers, polyvinyl acetals, polyvinyl esters, polyvinyl ethers, polyvinyl ketones, polyvinylpyridines, polyvinylpyrrolidones, polyamines, polycations, polyanions, ionomers, polyvinyl alcohols, polyvinyl acids, epoxy resins, silicones, waxes, polysaccharides, cellulosic polymers, polylactides, biopolymers, biodegradable polymers, conducting polymers, redox-polymers, polymers containing metal atoms, and copolymers or combinations thereof.

The photonic crystal material may comprise an ordered array of voids, and these voids may have an average diameter range of about 50 nm to 5000 nm, in some examples having an average diameter range of about 150 nm to 900 nm. The voids within the ordered array may be spherical, or substantially spherical, and may be interconnected as to form a network structure. A particular embodiment of such a material is referred to as an inverse opal, an example of which is described in PCT Publication No. 2008/098339, the entirety of which is hereby incorporated by reference.

In some examples, the described material may be based on a photonic crystal having a polymer having an ordered array of substantially spherical voids, forming a porous polymer. The disruption of the ordered array of voids may be caused by a physical deformation of this polymer. The cause of this physical deformation may be due to several phenomena, including but not limited to exceeding the glass transition temperature, exceeding the melting temperature, breaking of chemical bonds, breaking of physical bonds, presence of temperature-responsive additives (e.g., additives having thermal transitions either lower or higher than the base polymer material), or combinations thereof. The base polymer material in the photonic crystal material may be selected from the group including but not limited to polyacrylates, polymethacrylates, polyethers, polyesters, polyolefins, polyamides, fluoropolymers, biopolymers, inorganic polymers, phenolic resins, silicones, and copolymers thereof.

FIGS. 5 and 6 are tables listing monomers of example suitable polymers for use in the photonic crystal material. The glass transition temperatures ($T_g$) and melting point temperatures ($T_m$) are also listed.

In some examples, a porous polymer in the photonic crystal material may include linear polymer chains, branched polymer chains, or may be crosslinked to form a crosslinked polymer network. The crosslinking units in the crosslinked polymer network may be selected from the group consisting of but not limited to: covalent bonds, ionic bonds, polar covalent bonds, hydrogen bonds, hydrophobic interactions, coordinations bonds, or combinations thereof.

In some examples, a porous polymer in the photonic crystal material may include crosslinks. In some examples, crosslinking may provide additional structure stability to the polymer material, may prevent early or unwanted collapse of the structure, and/or may change (e.g., raise) the profile of the polymer's thermal transition. The amount of crosslinking may be controlled, since addition of crosslinkers above a threshold value (i.e., critical crosslinker loading) may cause the polymer to have permanent shape Retention—that is, the material may substantially retain its shape over the range of printing temperatures of interest. Depending on the nature of the polymer material as well as the nature of the crosslinking group (e.g., the length and/or flexibility of the chemical group between crosslinking points), this critical crosslinking loading may occur anywhere from around 0.1% to around 99.9% crosslinker content by volume, for example around 0.5% to around 5% (e.g., for certain short-chain crosslinkers).

The photonic crystal material may also be made as a Bragg Stack, for example using methods and/or materials as described in PCT Publication No. 2009/143625, the entirety of which is hereby incorporated by reference.

Examples of Thermally Printable Photonic Crystal Assemblies

Figure 4:
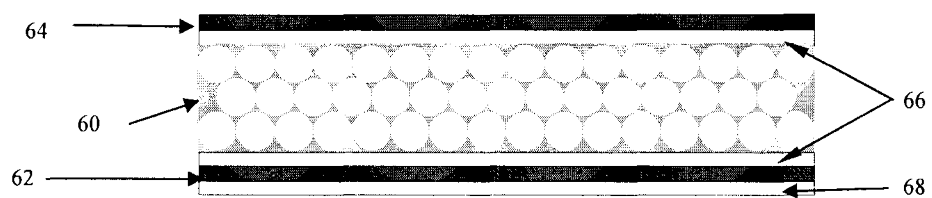
FIG. 4 is a schematic showing a cross-sectional view of an example thermally printable photonic crystal assembly.

FIG. 4 shows a cross-section design schematic of an example of a thermally printable photonic crystal assembly. In this example, the assembly may include a thermally printable photonic crystal material 60 which may be supported on a flexible or rigid base substrate 62. The base substrate 62 may be, for example, clear, opaque, colored, and may incorporate patterns or data content. Suitable substrate materials may include plastic films, plastic sheets, metal foils, and other suitable materials.

The assembly may optionally include a fixing coating, such as described above. The assembly may optionally include a protective and/or insulating top-coat 64, such as described above. The top-coat 64 which may include, for example, plastic films, lacquers, varnish, latex, or other materials that may prevent mechanical damage by abrasion and/or modulate or insulate against the heat flow transferred to the thermally printable photonic crystal material during the thermal printing process. One or more adhesive layers 66 may optionally be included between the substrate 62 and the photonic crystal material 60, and/or between the top-coat 64 and the photonic crystal material 60, in order to help improve bonding characteristics between the photonic crystal material 60 and these layers. Additional one or more adhesive layers 68 may optionally be applied to the back (i.e., a surface facing away from the photonic crystal material 60) of the substrate 62 for attachment of the assembly to an article or product, for example.

In some examples, the thermally printable photonic crystal assembly may include a component to provide a latent temperature-sensitivity. For example, the assembly may be initially protected by inclusion of a component (e.g., by a structural support preventing structural deformation or by a temperature buffer) such that it may display an insensitivity or a reduced sensitivity to thermal stimuli. After removing the support component, the assembly may then exhibit a greater temperature sensitivity.

In some examples, such protection may be offered by filling the voids of a porous polymer photonic crystal material with a liquid such as water, and the liquid may be sealed into the photonic crystal material by providing a hermetic cover-sheet or covering over the photonic crystal material, for example. The liquid may provide structure to the assembly, preventing or inhibiting sagging or deformation in response to thermal stimuli. In some examples, the liquid may also act as a thermal buffer. When the cover-sheet or covering is removed (e.g., by manually peeling off), the liquid in the voids may evaporate, thus removing the structural support and/or thermal buffer and resulting in the assembly being temperature-responsive.

In some examples, the thermally printable photonic crystal assembly may include a supportive component or additive that may be sensitive to ambient conditions. For example, such a supportive component or additive may be relatively rigid and may prevent the assembly from structurally deforming due to thermal stimuli. This supportive component or additive may be removed, for example by degradation upon contact with, for example, oxygen (e.g., in air), biological species (e.g., bacteria in air), ambient light and/or moisture (e.g., in air). An example photonic crystal assembly including such a supportive component or additive may initially be sealed by a hermetic and/or opaque cover-sheet or covering, protecting the supporting component or additive from removal. In this initial state, the photonic crystal material may be structurally supported and thus the assembly may exhibit none or little sensitivity to temperature. When the cover-sheet or covering is removed (e.g., by manual peeling), the supportive component or additive may be exposed to atmospheric conditions and may be removed to some extent, causing the assembly to become increasingly sensitive to temperature.

Such latent temperature-sensitivity may be useful, for example, in preserving the function of the assembly in a variety of temperature environments (e.g., during manufacture, during transport, before being applied to an article of interest) and may allow its temperature-responsiveness to be activated at a desired time (e.g., during thermal printing).

Example Methods of Manufacture

The fabrication of the disclosed thermally printable photonic crystal materials and assemblies may be carried out in a manner similar to that shown in PCT Patent Application No. 2008/098339, for example.

An example of the manufacture of an example thermally printable 3-D photonic crystal assembly is now described. In this example, a dispersion of substantially monodisperse silica microspheres ranging from about 150 to about 500 nm are prepared using the Stober method (W. Stober, A. Fink, E. Bohn, J. Colloid Interface Sci. 26, 62 (1968)). This dispersion is coated onto a letter-sized, 2 MIL Mylar sheet using a draw-down coating bar (R.D. Specialties). Following drying for 1 minute, the coating is infiltrated with a thin coating of reactive monomer mixture using a fixed-gap applicator (Elcometer), comprising 20-99.9% mono-methacrylate, 0-80% di-, tri-, or tetra-functional methacrylate, and 0.1 to 5% of UV radical initiator, by volume. In some examples, the monoacrylate may be methyl methacrylate, the di-functional acrylate may be ethylene glycol diacrylate, and the UV radical initiator may be phenyl-cyclohexyl-methyl ketone.

Following infiltration, the coating is cured on a UV conveyor system (Fusion UV, 300 watts/inch) at line-speeds of between 2 and 50 feet/minute. Following UV curing, the coating is etched in diluted aqueous hydrofluoric acid (2% aqueous solution) for 2 minutes, washed with distilled water, and dried with a nitrogen stream to generate an example thermally printable photonic crystal material with a thermal melting transition in the range of about 85° C. to about 105° C.

The example thermally printable photonic crystal material is then coated with a water-based polymer latex (Lumiflon, Asahi Glass Corp.) and dried under ambient conditions to generate a protective top-coat, resulting in a thermally printable photonic crystal assembly including a top-coat. The finished assembly may then be stored, transported, applied to a surface or product, and/or printed as appropriate.

In this example, in order to print on the assembly, the assembly is fed into a thermal printer (Zebra LP2844 Direct thermal label printer), and printed using appropriate programming of the machine software. Adjustments in print color may be achieved by varying settings such as the print head pressure, speed, and temperature.

An example of the manufacture of an example thermally printable 1-D photonic crystal assembly is now described. On one hand, a dispersion of silica nanoparticles is provided (Ludox SMA, Grace & Co.), and diluted to 3% solids using deionized water. On the other hand, a dispersion of titania nanoparticles is provided (Nanoamor, 15 nm particle size rutile), and diluted to 2.5% solids using deionized water. These two dispersions are spin-coated onto a piece of 2 MIL Mylar sheet using a Laurell spin-processor, using a spin speed of 1500 rpm for 2 minutes for each layer. The silica and titania dispersions are alternately spin-coated to build up a 1-D photonic crystal material, allowing each layer to dry for 10 minutes in ambient conditions before depositing the subsequent layer. Following the layering process, a drop of methyl methacrylate monomer with 1% dissolved 2-Hydroxy-2-methylpropiophenone UV initiator (both sourced from Aldrich Chemical Co.) is placed on the photonic crystal material, and a piece of 1 MIL mylar is placed on the top and laminated using a rubber roller to spread the monomer and fully infiltrate the photonic crystal material. The laminated assembly is cured for 1 pass at 20 ft/min on a Fusion UV conveyor system, with a 300 W/inch UV power. Following curing, the top mylar substrate is removed, and the sample immersed in 6% aqueous hydrofluoric acid for 10 minutes to dissolve the silica particles, followed by thorough washing with water. The etching process may be used to create porosity in the silica-containing layers by etching out the silica component. This results in an example thermally printable photonic crystal material with a thermal melting transition in the range of about 85° C. to about 105° C.

The example thermally printable photonic crystal material is then coated with a water-based polymer latex (Lumiflon, Asahi Glass Corp.) and dried under ambient conditions to generate a protective top-coat, resulting in a thermally printable photonic crystal assembly including a top-coat. The finished assembly may then be stored, transported, applied to a surface or product, and/or printed as appropriate.

In this example, in order to print on the assembly, the assembly is fed into a thermal printer (Zebra LP2844 Direct thermal label printer), and printed using appropriate programming of the machine software. Adjustments in print color may be achieved by varying settings such as the print head pressure, speed, and temperature, for example.

Other manufacturing and printing methods may also be suitable. Variations to the manufacture methods may be made to obtain certain desired thermal printing profiles (e.g., to allow for thermal printing at different printing temperatures, according to the specifications of a thermal printer). Other constituents and/or additives may be used as appropriate.

Examples of the disclosed methods, systems, materials and assemblies may be useful in applications for security, authentication, and brand protection, as well as applications in graphic arts, and printing in general.

The embodiments and examples of the present disclosure described above are intended to be examples only. Alterations, modifications and variations to the disclosure may be made without departing from the intended scope of the present disclosure. In particular, selected features from one or more of the above-described embodiments and examples may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. A thermally printable photonic crystal assembly comprising:

a thermally printable photonic crystal material containing voids; and a substrate attached to the thermally printable photonic crystal material via thermal bonding or lamination;

wherein the assembly is responsive to selective application of heat equal to or above the thermal threshold, such that after the thermal bonding or lamination, when a portion of the photonic crystal assembly and not the remainder of the photonic crystal assembly is exposed to a temperature equal to or above a thermal threshold, a corresponding portion of the material has a collapse or decrease in spacing of its voids which causes an optically detectable change in a reflection peak of the corresponding portion of the material.

2. The assembly of claim 1 further comprising at least one of: an adhesive layer, a top substrate, and a protective cover-sheet.

3. The assembly of claim 1 comprising a thermally insulating top-coat for modulating transfer of heat to the photonic crystal material.

4. The assembly of claim 1 comprising a fixing coating coated on external and internal surfaces of the photonic crystal material, the fixing coating comprises a crosslinking initiator and at least one of a crosslinkable monomer, pre-polymer, polymer, and a crosslinking agent.

5. The assembly of claim 1 wherein the assembly is responsive to the selective application of heat to exhibit monochrome, high-contrast graphics.

6. The assembly of claim 1 wherein the assembly is responsive to the selective application of heat to exhibit multi-color graphics.

7. The thermally printable photonic crystal assembly of claim 1, wherein the voids are an ordered array of voids.

8. The thermally printable photonic crystal assembly of claim 1 comprising periodically repeating layers with different refractive indices.

9. The thermally printable photonic crystal assembly of claim 1, wherein the detectable change in reflection peak is a change from a peak at a longer wavelength to a peak at a shorter wavelength.

10. The thermally printable photonic crystal assembly of claim 1, wherein the detectable change in reflection peak is a change in intensity.

11. The thermally printable photonic crystal assembly of claim 1, wherein the collapse is a partial collapse.

12. The thermally printable photonic crystal assembly of claim 1 wherein the thermally printable photonic crystal material has a first deformation at a first thermal threshold, and a second deformation at a second thermal threshold.

13. The thermally printable photonic crystal assembly of claim 1 comprising wax nanoparticles embedded in the thermally printable photonic crystal material, the wax nanoparticles having a thermal threshold that is different than a polymer material in the thermally printable photonic crystal material.

14. The thermally printable photonic crystal assembly of claim 1 wherein the assembly is responsive to a laser source.

15. The thermally printable photonic crystal assembly of claim 1 wherein the thermally printable photonic crystal material is etched to remove a component having a different thermal threshold than the thermal threshold of the assembly.

16. The thermally printable photonic crystal assembly of claim 1 wherein the substrate is a polymer sheet.

* * * * *